United States Patent [19]

Sullivan

[11] Patent Number: 5,382,440

[45] Date of Patent: *Jan. 17, 1995

[54] FLAKY PIE SHELLS THAT MAINTAIN STRENGTH AFTER FILLING

[75] Inventor: Joanne Sullivan, Wyckoff, N.J.

[73] Assignee: Nabisco, Inc., Parsippany, N.J.

[*] Notice: The portion of the term of this patent subsequent to Jan. 3, 2012 has been disclaimed.

[21] Appl. No.: 984,407

[22] Filed: Dec. 2, 1992

[51] Int. Cl.$^6$ ................................................ A23L 1/10
[52] U.S. Cl. ................................ 426/138; 426/391; 426/496; 426/553; 426/804
[58] Field of Search .............. 426/138, 556, 553, 502, 426/560, 391, 496, 804

[56] References Cited

U.S. PATENT DOCUMENTS

| | | | |
|---|---|---|---|
| 3,388,997 | 6/1968 | Schaible | 426/502 |
| 4,479,976 | 10/1984 | Lansbergen | 426/586 |
| 5,258,197 | 11/1993 | Wheeler | 426/804 |

FOREIGN PATENT DOCUMENTS 01-19042  1/1989  Japan .

OTHER PUBLICATIONS

Feuge 1955 Acetoglycerides Food Technology (Jun. issue) pp. 314–318.
Baur 1954 Aceten Fats Journal of the American Oil Chemists Society (Apr. issue) pp. 147–151.
Patton 1976 Biomedical Aspects of Lactation Pergamon Press New York pp. 78–83.

*Primary Examiner*—Carolyn Paden

[57] ABSTRACT

Flaky pie shells that maintain their structural integrity even when filled with high moisture fillings contain fats bearing short $C_2$ to $C_4$ acid residues and long, saturated $C_{16}$ to $C_{22}$ fatty acid residues. One preferred embodiment contains fats bearing butyric acid residues and residues of fatty acids derived from fully hydrogenated oils containing at least about 75% stearic acid such as hydrogenated soybean oil or hydrogenated canola. Another preferred embodiment contains fats bearing the same complement of saturated long residues, but the short residues are derived from acetic and propionic acids. These fats are low in calories and low in palmitic acid and trans unsaturated acid residues. Pie shells made with the fats are tender and exhibit improved cohesiveness and mechanical strength during shipping, handling and storage.

15 Claims, No Drawings

FLAKY PIE SHELLS THAT MAINTAIN STRENGTH AFTER FILLING

TECHNICAL FIELD

This invention relates to flaky pie shells that maintain their strength and structural integrity after filling, and compositions and processes for their preparation.

The basic ingredients of pie doughs include water, flour and shortening. Dough compositions generally have relatively low moisture contents of from about 10 to about 25%, and this results in more delicate handling characteristics of pie doughs than higher moisture doughs such as bread. After baking, pie shells are fragile and easily damaged during commercial handling. Moreover, the bottom crusts of pies having high moisture fillings such as, for example, fruit or meat often become soggy on storage.

A number of dough additives and handling procedures have been suggested to maintain the structural integrity of pie shells during shipping, handling and storage. Sheet strength has been improved by adding glycerol to the dough, and the effect increases with increasing concentrations of glycerol (U.S. Pat. No. 3,294,547 to Kooistra). However, browning of the dough on baking increases with higher glycerol concentrations (DeRenzo, D. J., Doughs and Baked Goods, Noyes Data Corp., Park Ridge, N.J., 1975, page 149).

The addition of a suitable reducing agent, preferably a sulfur dioxide agent or a substance containing a sulfhydryl group to the normal ingredients of a pie dough in controlled amounts has been suggested to increase workability and elasticity of the dough (U.S. Pat. No. 3,149,979 to Bohn and Wiseman). However, mixing conditions have to be controlled so that the reaction of the added chemicals does not proceed too far, and the addition of sulfur compounds can contribute to an off flavor (DeRenzo, cited above, pages 143 to 144).

A wheat gluten fraction has been added to pie crust dough to decrease breaking during handling (U.S. Pat. No. 3,692,535 to Norsby and Johnson). Alternatively, a method for processing the pastry dough so that the gluten substantially develops has been suggested (U.S. Pat. No. 3,116,149 to Luedke). These treatments are directed to improving the properties of the dough, though, rather than to improving the properties of the baked shell.

Fragile shells are generally protected from damage during commercial handling by the design of special containers; see, for example, the packaging systems suggested by Caporaso in U.S. Pat. Nos. 4,399,157 and 4,435,434. To achieve a stabilized product that maintains an unbaked crust dough in contact with a normally liquid filling material, Ketch and Barton reduced the moisture of the filling and dough portions to an equilibrium level of less than 15% before packaging (U.S. Pat. No. 3,492,127). In addition, the unbaked crust dough contained glycerine or other polyhydric alcohol to replace part of the moisture, and the formulation employed a compound capable of reducing the disulphide linkages of the gluten. One disadvantage of products of this type is that they are either dry to the taste upon eating or require rehydration prior to consumption.

Munter and Ahlgren suggested another procedure for producing filled pies while preserving the bottom crust (U.S. Pat. No. 4,265,919). A frozen, pre-prepared shell is disclosed to be packaged along with a food material containing a liquid component also in the frozen condition. The shell is positioned over a centrally-depressed receptacle containing the normally-liquid material by means of an outwardly and downwardly extending rim around the receptacle. To prepare the product for consumption, the combined package is heated to liquify the filling material, and the package is then inverted to permit the liquid ingredients to fill the pastry shell for final baking. While products of this type may provide a degree of convenience, they also add a degree of inconvenience by requiring the use of the particular filling with which it is packaged. Also, the patent does not address the problem of how to maintain the structural integrity of the bottom crust of the filled pie on storage after cooking.

The fat component in pie crusts is typically lard or a plastic vegetable shortening made from, for example, soybean or cottonseed oil. This contributes significantly to the calories in the crust, since most pie crusts contain shortening in an amount ranging from about 35% to about 85% by weight of the total flour, and dietary fat is the most concentrated source of energy of all the nutrients, supplying 9 kcal/gram, about double that contributed by carbohydrate. Moreover, lard contains significant amounts of palmitic acid, and vegetable shortenings are generally partially hydrogenated so they contain significant levels of transunsaturation. Yet palmitic acid, like myristic and lauric acid, has been shown to increase plasma cholesterol concentrations (Bonanome, A., and Grundy, S. M., New Eng. Jour. Med. 318 1244–1248 (1988)), and trans unsaturated fatty acids have been recently shown to raise low density lipoprotein serum cholesterol levels and to lower high density lipoprotein serum cholesterol levels in adults fed fats having these acids (Mensink, R. P., and Katan, M. B., New Eng. Jour. Med., 323:439–445 (1990)). Hence, a goal of recent research in the food industry has been to minimize or eliminate palmitic acid-containing and partially hydrogenated fats in food products, and to decrease caloric intake from fats.

It would be desirable to have low calorie pie shells that contain little or no trans unsaturated fats, and decreased amounts of palmitic acid. It would also be desirable to have pie shells that are flaky yet cohesive, maintaining their structural integrity on handling or storage without chemical additives or special packaging even when employed as the bottom crust of a juicy pie.

DISCLOSURE OF THE INVENTION

An object of the present invention is to provide a new group of pie crust fats that are low in calories, low in palmitic acid, and low in or free of trans unsaturation.

It is another object of the invention to provide flaky, cohesive, mechanically strong pie shells that maintain their properties when filled with high moisture fillings and on storage without the addition of special strengthening additives or the use of special packaging.

These and other objects are accomplished by the present invention, which provides flaky, cohesive pie shell compositions comprising triglycerides bearing $C_2$ to $C_4$ short acid residues and long $C_{16}$ to $C_{22}$ saturated fatty acid residues, flour and water. In preferred embodiments, the filling fats contain triglycerides bearing long, saturated fatty acid residues derived from hydrogenated oils having at least about 75% stearic acid residues, and short acid residues derived from acids selected from the group consisting of propionic acid, butyric acid, mixtures of acetic acid and propionic acid, mixtures of acetic acid and butyric acid, mixtures of propionic acid and butyric acid, and mixtures of acetic acid, propionic acid, and butyric acid. Three particularly preferred embodiments contain fats bearing the same complement of long residues, such as, for example, long residues derived from hydrogenated canola or hydrogenated soybean oil, and short residues derived from butyric acid, from a mixture of acetic and propionic acids, or from a mixture of acetic, propionic, and butyric acids.

Pastry doughs, single-crust, single-crust filled and double-crust filled pies having the shells of this invention as well as the baked and unbaked shells are disclosed. These products are lower in calories and lower in palmitic acid and trans unsaturation than typical pie crusts prepared with conventional fats such as lard or vegetable shortening, and, because hydrogenated oils are employed to make the pie shell fats in preferred embodiments, more oxidation resistant. The shells are cohesive and maintain their texture while also maintaining their structural integrity during shipping, handling and storage. Pie products made using the shells do not sog and fall apart when cut out of the pan, even after storage or when the shells are filled with high moisture fillings. Yet the crusts are tender and flaky.

Methods of maintaining the structural integrity of pie shells are also disclosed.

GENERAL DESCRIPTION OF THE INVENTION

The pie shells of this invention have a fat component enriched with triglycerides having both long, saturated $C_{16}$ to $C_{22}$ fatty acid residues and short $C_2$ to $C_4$ acid residues (hereafter referred to as "short/long triglycerides"). Most preferably, the long fatty acid residues will be predominantly, i.e., at least about 75% and, in some embodiments at least about 90%, $C_{18}$, and the short acid residues will be either predominantly $C_4$, a mixture of $C_2$ and $C_3$, or a mixture of $C_2$ to $C_4$ acid residues.

Denoting the aliphatic portion of the long fatty acid substituent as L and the short as S, the pie crusts of this invention contain fats comprising a mixture of SSL, SLS, LLS, and LSL species described by the following formulae:

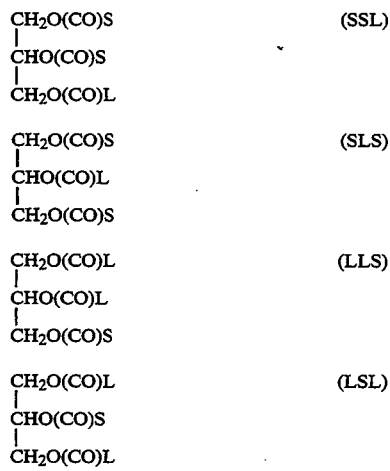

where
each L, independently, is a long chain saturated aliphatic group having between 15 and 21 carbons, derived from a fatty acid having 16 and 22 carbons; and
each S, independently, is a short chain group having 1 to 3 carbons, derived from an acid having 2 to 4 carbons.

Depending upon the preparative procedure, the triglyceride mixtures may also contain triglycerides of the formulae

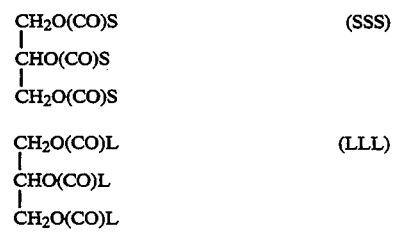

However, preferred mixtures contain essentially no SSS and about 2% or less LLL.

Short acid residues have 2 to 4 carbons. Short residues are derived from carboxylic acids of the formula SCOOH, where S is a short chain aliphatic group having 1 to 3 carbons. As denoted herein, where triglycerides are described as bearing pendant groups derived from acids having 2, 3, or 4 carbons, compositions derived from acids having predominantly 2, 3, or 4 carbons are included. Acylation of a glycerol hydroxyl by acid SCOOH results in the attachment of short chain S to the glycerol backbone by means of an ester linkage (—O—(CO)—). Where there is more than one short group attached to a glyceride, the groups may be the same or different. As used herein, the term "acid residue" refers to an acyl group comprising a short chain portion, here: S, and a carbonyl group.

Short chain S may be straight or branched. Short chain S may be derived from any synthetic or natural organic acid including, but not limited to acetic (ethanoic), propionic (propanoic), butyric (butanoic), and the like acids. As used herein, chemical names include isomeric variations; for example, "butyric acid" includes normal-butyric acid (butanoic) and iso-butyric (2-methylpropanoic) acid, and so forth. Preferred acids are acetic, propionic, and butyric acids, and mixtures of these.

The long saturated pendant groups are derived from fatty acids of the formula LCOOH, where L is a saturated aliphatic group having 15 to 21 carbons. L groups may be derived from any synthetic or natural, straight or branched saturated organic acid including, but not limited to, palmitic (hexadecanoic), stearic (octadecanoic), arachidic (eicosanoic), behenic (docosanoic), and the like acids.

Unsaturated long groups may also be present in the mixtures. These are derived from unsaturated acids of the formula UCOOH, where U is a $C_{15}$ to $C_{19}$ unsaturated group, including, but not limited to, palmitoleic (9-hexadecenoic), oleic (cis-9-octadecenoic), elaidic (trans-9-octadecenoic), vaccenic (trans-11-octadecenoic), linoleic (cis, cis-9,12-octadecedienoic), linolenic (9,12,15-octadecatrinoic and 6,9,12-octadecatrienoic), eleostearic (9,11,13-octadecatrienoic), arachidonic (5,8,11,14-eicosatetraenoic), and the like acids. L groups may be derived from hydrogenated U groups.

The various L and U groups can be derived from mixtures of fatty acids obtained from natural oils such as soybean, safflower, sunflower, sesame, peanut, corn, olive, rice bran, mustard seed, cottonseed, poppyseed, rapeseed, marine, meadowfoam and the like oils; fats such as babassu nut oil, palm oil, palm kernel oil, tallow, lard, shea butter, dairy butter; or plant waxes such as jojoba. Fat mixtures and/or fractions, crystallized fats, interesterified fats and mixtures of these may also be employed.

Mixtures of L groups are preferably derived from oils and fats that are hydrogenated, most preferably fully hydrogenated. Hydrogenated fats having at least about 70%, preferably at least about 75%, stearic acid residues such as, for example, hydrogenated peanut oil, hydrogenated olive oil, hydrogenated soybean oil, hydrogenated sesame oil, and hydrogenated corn oil are especially desirable for some embodiments. Other embodiments employ L moieties derived from hydrogenated fats having at least about 90% stearic acid residues, such as hydrogenated sunflower oil, hydrogenated safflower oil and hydrogenated canola. Preferred hydrogenated feedstocks are low in palmitic acid.

Component triglycerides making up the pie shell fats of this invention may be prepared using synthetic procedures known to those skilled in the art, such as, for example, directly esterifying glycerol or glycerol esters with fatty acids, fatty acid halides (notably chlorides) or fatty acid anhydrides, transesterifying glycerol with fatty acid esters, or interesterifying long and short chain triglycerides for such time and under such conditions that triglycerides bearing long and short residues form. Starting materials for triglyceride preparations may be obtained commercially or isolated from natural sources. Alternatively, component triglycerides may be isolated from natural or processed fats or oils, or fractions thereof.

Some desirable triglyceride mixtures are prepared using a random interesterification of triacetin, tripropionin and/or tributyrin with a substantially hydrogenated fat having at least about 70% in some cases at least about 75%, and, in some embodiments, at least about 90%, stearic acid residues. For example, pie shell fats of this invention can be derived by the random interesterification of tributyrin with hydrogenated canola or hydrogenated soybean oil or the random interesterification of triacetin and tripropionin with hydrogenated canola or hydrogenated soybean oil. Mixtures and fractions of triglycerides may also be employed, such as those derived by blending the products of different interesterifications. Example preparations are illustrated hereafter.

Isolated or prepared triglycerides are purified using techniques known to those skilled in the art. These include, but are not limited to, steam deodorization, fractional crystallization, distillation, chromatography, and the like. In some embodiments, pie shell fats of this invention are prepared by blending products purified by one means, e.g., steam deodorization, with fractions obtained in purifications using other means, e.g., fractional crystallization and/or distillation. Example purifications are illustrated hereafter.

BEST MODES FOR CARRYING OUT THE INVENTION

In the practice of this invention, short/long triglycerides, fats bearing short $C_2$ to $C_4$ acid residues and long, saturated $C_{16}$ to $C_{22}$ fatty acid residues as defined above, are incorporated in full or partial replacement of the fat component in pie shells, tart shells, and the like.

As used herein, a "pie shell" includes any edible pastry casing having a fat component, and includes pie bottom, side, and top or cover crusts, baked or unbaked.

The pie shell compositions of this invention typically have a fat component making up about 30 percent to about 85 percent by weight of the total flour in the composition. The shell dough compositions typically additionally have an aqueous component of water, milk, fruit juice or other liquid, which, on baking, evaporates to some extent. Both low moisture and intermediate moisture pastries are encompassed by this invention.

The short/long triglycerides may be incorporated either alone, or in combination with another fat and/or fat mimetic, into any pie shell. Other fats include butter, lard, shortenings, natural triglycerides rich in highly desirable or essential fatty acids, such as oleic, linoleic, linolenic, or eicosapentaenoic acid, triglycerides bearing fatty acids having beneficial attributes such as those associated with conjugated linoleic acid isomers, medium chain triglycerides and the like. Other fat mimetics include any heretofore suggested as edible fat replacements, including, but not limited to, sugar esters, neoalkyl esters, polyglycerol esters, malonate esters, propoxylated glycerols, retrofats, carboxy/carboxylates, polyvinyl alcohol esters and the like.

When employed either alone or in products with other fats, short/long triglycerides are added to the pie shell compositions in amounts effective to provide a cohesiveness and structural integrity to the shell. These are also desirably added in amounts effective to provide significant caloric reduction of the calories due to fat. At least a 25% or greater replacement would be effective for these purposes, and replacements of 50 to 100% are desired in many cases. Especially preferred pie shell compositions have a fat component comprised entirely of short/long triglycerides.

The pie shells also have a starch component typically comprising a flour commonly used for pastry doughs such as all-purpose or unbleached wheat flour. Potato, rice, or other cereal flours such as corn, oats, rye, and mixtures thereof can be used if variations from traditional pie crusts are desired. The pie shells typically also contain salt.

The shells may, optionally, contain other ingredients familiar to the skilled artisan such as browning agents, plasticizers, spices, flavorings, sweetners, and mold, bacteria, and yeast inhibitors. Browning agents include milk solids, corn sugar solids, or dihydroxyacetone that promote a golden brown color; these can be added up to about 12% by weight of the unbaked dough composition. Plasticizers include, but are not limited to, propylene glycol, glycerine, sorbitol, dextrose, levulose, maltose, and corn syrup solids; these are usually present in small amounts (e.g., 0–3% by weight of the uncooked dough composition). Mold and yeast inhibitors, include, for example, sodium benzoate, benzoic acid, calcium propionate, sodium propionate, sorbic acid, potassium sorbate, calcium sorbate, diethylpyrocarbonate, and salts and esters of monohydroxybenzoic acid, added in small quantities (e.g., 0.15 to 0.3% by weight of the uncooked dough). Antioxidants such as, for example, butylated hydroxyanisole, tertiarybutylquinone, and citric acid typically are not required, but these may be included in some instances.

To achieve special finishes, pies and other pastries formulated with the pie shell compositions of this invention may be washed with water, milk, egg (whole, yolk, or whites), butter, and the like, or mixtures thereof, before, during, and/or after baking using methodology known to the skilled artisan.

Broadly speaking, the pie shells of this invention can be employed in a variety of pastries, including fruit, custard, chiffon, pudding, meat, and vegetable pies, both single- and double-crust; tarts; quiches; and certain varieties of cookies, crackers and snacks. The shells are especially adapted for high moisture filled single-crust and double-crust pies and tarts such as cherry, berry, apple, peach, rhubarb and other fruit pies, as well as juicy meat and/or vegetable pot pies.

For a typical pie shell, the pie dough is formulated by cutting the fat into the starch component, salt and other dry ingredients for a period of time sufficient to provide a uniform blend. Sufficient aqueous components are then added under conditions effective to provide the consistency typically desired for shaping and forming conventional pastry doughs, e.g., sufficient to make a dough that can be rolled out. Typically, the complete dough admixture will be blended for about three minutes in a suitable mixer. An exemplary formulation employs about 53 to 57% by weight flour, about 25 to 27% by weight fat, about 15 to 21% by weight water and about 1% salt. Specific examples are illustrated hereafter.

On completion of the dough preparation, the dough is rolled out, or fed to suitable crust forming equipment wherein it is divided into suitably sized portions and then sheeted to the size required. Typical of the equipment that can be employed is the Colborne crust forming equipment which typically shapes the dough into rectangular blocks of desired weight and then feeds the individual blocks into a system of cross-sheeting rolls to form individual dough sheets of suitable size and having substantially continuous surfaces. Equipment of this type is typically capable of automatically depositing continuous dough sheets of this type into suitable baking pans. The baking pans can be of metal foil, such as aluminum foil, or they can be of ovenable ceramic, glass, paper or plastic materials. The top edge of the dough sheets can be crimped and fluted as desired.

The pie shells of this invention and pies and other food products made with them exhibit a number of desirable characteristics. Both the pie crust dough and the baked shell are cohesive and mechanically strong, maintaining structural integrity on being rolled or sheeted out, after baking on handling, storage and/or transport, and after filling. Pieces of pies made with the shells of this invention lift easily out of the pan without breaking apart, even after storage for some time with a high moisture filling. In this respect, the pie shells of this invention are significantly superior to more fragile pie shells made with either lard or conventional vegetable shortenings. When used as top or bottom crusts, the shells of this invention also exhibit tenderness and flakiness. Pie crust flakiness, or the tendency to separate into strata or layers when broken, is generally described as falling into one of three classes: "mealy", wherein the baked crust breaks into fairly straight lines exhibiting a fracture surface like a cookie, "long-flake" wherein the broken baked crust fractures along different lines at different levels and shows separation into layers parallel to the surface, and "short-flake" or "flaky-mealy", intermediate between mealy and long-flake. Desirable baked pie shells of this invention have long-flake flakiness.

Another advantage of the invention is that preferred embodiments are low in calories, low in trans unsaturation and low in palmitic acid. Because preferred embodiments contain little or no unsaturation, the pie shell fats are resistant to oxidation, and the shells do not become rancid as quickly as ordinary ones.

Another advantage of the invention is that desirable organoleptic characteristics can be achieved using short/long triglycerides as the fat component in the shells. Pies made with preferred shells of this invention have a pleasant eating quality.

EXAMPLES

The following examples are presented to further illustrate and explain the present invention and should not be taken as limiting in any regard. Unless otherwise indicated, all parts and percentages are by weight, and are based on the weight at the particular stage of the processing being described. Solid fat indices (herein abbreviated S.F.I.) are determined using dilatometry according to A.O.C.S. Method Cd 16–81 (1989), reporting solids at 50° F. (10° C.), 70° F. (21.1° C.), 80° F. (26.7° C.), 92° F. (33.3° C.), and 100° F. (37.8° C.). Mettler dropping points (M.D.P.) are determined using a Mettler Thermosystem FP 800 following A.O.C.S. Method Cc 18–80 (1989).

Nuclear magnetic resonance (NMR) data reported are proton NMR data. NMR S/L ratios are determined as the ratio of intensities of the methyl ($-CH_3$) resonances for the short and long fatty acid groups, respectively, obtained by dividing the integral areas attributable to S components by the areas attributable to the L, and have experimental errors of 5 to 10%. In a typical NMR spectrum at 300 MegaHertz or higher, the long acid methyl resonance occurs farthest upfield, at ~0.9 ppm, as a triplet. The short acid methyl resonance is structure dependent and occurs at ~2.00 ppm (acetyl groups), ~1.15 ppm (propionyl groups) and ~0.95 ppm (butyryl groups.).

Fat product analysis using supercritical fluid chromatography (S.C.C.), separating and quantifying the mixture components, generally employ a standard procedure. After filtering through a 0.45 micron filter, 0.1 ul of a 30 to 50 mg/ml sample is injected onto a 1×100 mm Deltabond Cyano TM column from Keystone Scientific in a Suprex Model 200A S.C.C. having an S.C.C.-grade carbon dioxide mobile phase and an oven temperature of 125° C. A linear pressure gradient of 100 to 300 atmospheres is applied over a course of 20 minutes (i.e., 10 atm/min), followed by a hold at 300 atmospheres for 10 minutes. A flame ionization detector at 400° C. detects emerging mixture components run against an internal standard of methyl tetradecanoate (10 to 12 mg/mL) in methylene chloride. External standards of mono-, di-, and tristearin (~10 mg/mL each) are run under identical conditions. Using these peak areas, the peak areas of the sample are normalized, added together, and divided by the total to obtain percentages of LSS & SLS, LLS & LSL, and LLL in the short/long mixtures.

Moisture in shortbread products is determined using a Computrac TM MA-5A TM moisture analyzer, which measures moisture thermogravimetrically. The instrument automatically weighs and calculates the percent moisture at temperatures ranging from 75° C. to 165° C.; unless otherwise indicated, measurements herein are reported for 150° C.

EXAMPLE 1

In this example, reduced calorie fat mixtures for use in pie crusts are prepared by interesterifying hydrogenated canola (refined, low erucic rapeseed oil containing 4% palmitic acid, hydrogenated at 180° C. and 60 lbs hydrogen until the Iodine Value (IV) is ≦3) with triacetin and tripropionin.

One molar equivalent hydrogenated canola (899 g), 1 molar equivalent of triacetin, and 11 molar equivalents of tripropionin are interesterified in the presence of 0.2 to 0.3% sodium methoxide by heating to ~110° C. with agitation under a vacuum for about half an hour until color develops. (The M.D.P. may be checked at this time, and the reaction continued if the M.D.P. has not dropped sufficiently.) Phosphoric acid (~0.2 to ~0.5%, at least twice the amount of sodium methoxide) is added to stop each reaction and neutralize the mixture, followed by the addition of 0.5% activated bleaching clay (Tonsil Optimum FF), 0.5% diatomaceous earth, and 1000 ppm citric acid (dissolved in water) to decolorize and remove soaps. The treatment is continued for ½ to 1 hour at 110° C. The products are cooled to 80° C., filtered, bleached, and steam deodorized at 210° C. for 2 to 3 hours.

Using this procedure, a product having a M.D.P. of 17.6° C. and an NMR S/L of 1.8 is obtained. The product has the following S.F.I.: 55% at 50° F., 32.3% at 70° F., 7.4% at 80° F., and 0% at 92° F. S.C.C. species analysis shows 82.3% SSL/SLS, 15.7% LLS/LSL, and 2.0% LLL. A fatty profile (using NMR) shows 7% acetic acid, 57% propionic acid, and 36% stearic acid residues in the product.

EXAMPLE 2

This example illustrates the preparation of another pie shell triglyceride mixture of this invention. Hydrogenated soybean oil is randomly interesterified with 2.5 moles of tributyrin and steam deodorized as described in Example 1 above. A product having a M.D.P. of 33.2° C. and an S.F.I. of 66.8% at 50° F., 36.9% at 70° F., 12.2% at 80° F., 7.7% at 92° F. and 6.9% at 100° F. is obtained. S.C.C. species analysis shows 69.9% SSL/SLS, 28.0% LLS/LSL, and 2.1% LLL. It is then distilled twice [or does "2X" refer to a second fraction?] to yield a purified fraction having an S.C.C. species analysis showing 54.0% SSL/SLS, 45.8% LLS/LSL, and 0.2% LLL.

EXAMPLE 3

This example illustrates the preparation of a triglyceride mixture tested as the fat component of a pie shell in a subsequent example. Hydrogenated canola is randomly interesterified with six moles of triacetin and six moles of tripropionin and purified as described in Example 1 above. A product having an S.F.I. of 78.0% at 50° F., 58.3% at 70° F., 45.1% at 80° F., 1.2% at 92° F. and 0.5% at 100° F. is obtained.

EXAMPLE 4

This example illustrates the preparation of control pie crusts made with an all-purpose vegetable shortening to use for comparison with pie crusts made with the fats of this invention.

Central Soya ™ all-purpose vegetable shortening at 72° F. (63.5 g, ~⅓ cup+1 T) is cut into flour (135.5 g, ~1 cup) and salt (2.5 g, ~½ t). The shortening is very soft at room temperature and cuts easily into the flour. The shortening tends to smear, penetrating the flour, and forms oblong globules of fat dispersed within the flour. Ice water (36 g, ~2 T) is sprinkled over the mixture and worked in with a fork to form a ball of dough. The dough is soft, greasy and slightly tacky. The dough is rolled out and used to make single-crust shells baked at 450° F. for about 14 minutes or 400° F. for about 20 minutes. The dough is also used to make single-crust and double-crust pies filled with Lucky Leaf ™ cherry pie filling.

After baking, the crust puffs and has nonuniform blisters. It has a light golden color with darker edges and bottom. The texture is tender and moderately flaky, exhibiting short-flake types. A Compu-Trac ™ measurement (@ 150° C.) shows 2.75% moisture (day 1). After a six day storage at room temperature, the appearance remains similar, and moderate short-type flaking is maintained. The crust has a slightly waxy mouthfeel.

On filling, the shell becomes softer after overnight storage in the refrigerator, and the crust falls apart as a slice is removed from the pan. A Compu-Trac ™ measurement (@ 150° C.) of the upper crust edges shows 14.1% moisture (day 6).

The double-crust pie has a crust that was soft and tender, but more mealy than flaky. The edges are golden brown, but the top and bottom crusts are underbaked in appearance and do not look flaky. A pie piece falls apart as a slice is removed from the pan. On storage in the refrigerator for 5 to 6 days, the crust edges becomes softer and the bottom becomes soggy. Compu-Trac ™ measurements (@ 150° C.) of the upper crust edges show 14.0%, 13.4% moisture (day 6).

The preparation of crusts with the same all purpose vegetable shortening is repeated except that the ingredients are refrigerated overnight at 40½° F., and the time interval of cutting the shortening into the flour is varied from shorter intervals of about 45 to 100 seconds to long intervals of about 120 to 600 seconds. A shorter cutting time produces a longer flake crust; a longer cutting time produces a smaller flake or semi-flaky/mealy type of crust. The crust textures produced are tender and soft. The filled crusts are soggy and have little structural integrity.

EXAMPLE 5

This example illustrates the preparation of single-crust shells and filled single-crust and double-crust pies like those set out in Example 4 above, except that the triglyceride mixture prepared in Example 1 above is used in place of the vegetable shortening. Comparisons are made with the all-purpose vegetable shortening control pies and crusts of Example 4.

The fat (63.5 g at 72½° F.) is cut into the flour (135.5 g) in the first stage, forming small pea-size globules of fat dispersed within the flour. The fat does not coat/penetrate into the flour like the control, and the doughs require more water to form a cohesive ball [~36 to 38 g]. The dough rolls out well, but is slightly harder to roll and requires more force than the control. After baking, the single-crust shell is comparable in appearance to the control, having some puff and nonuniform blisters. The texture is tender and flakier than the control, with longer flakes. A Compu-trac ™ measurement (@ 150° C.) shows 2.53% moisture (day 1), comparable to the control.

A single-crust pie filled with cherry pie filling softens after overnight storage in the refrigerator, yet a slice of pie can easily be removed from the pie pan without falling apart. The crust remains firmer, yet as soggy as the control filled pie. A Compu-trac ™ measurement (@ 150° C.) of the edge shows 14.2% moisture (day 6), showing a similar moisture pickup as the control.

The top and bottom crusts of the filled double-crust pie look baked and flakier than the filled double-crust control. A slice of pie can be removed from the pie pan without the crust falling apart. The crust is firmer and less soggy than the control. A Compu-trac TM measurement (@ 150° C.) of the edge shows 16.1%, 15.6% moisture (day 6), greater moisture than the control, yet the integrity of the crust is better.

The preparation of crusts with the same (Example 1) fat is repeated except that the ingredients are refrigerated overnight at 40+° F. and the time interval of cutting the shortening into the flour is varied from shorter intervals of about 45 to 100 seconds to long intervals of about 120 to 600 seconds. Both longer and shorter times produced longer-flake crusts. At refrigerated temperatures, the fat is difficult to cut into the flour; hence, it is advantageous in the practice of the invention to employ fats at ambient (not refrigerated) temperatures. The crust textures produced are flaky, fracturable and tender, but slightly tougher than the controls prepared using the same method.

EXAMPLE 6

This example illustrates the preparation of single-crust, single-crust filled, and double-crust control pie crusts like those prepared in Example 4 above, except that they are made with lard as a comparative control.

Three crusts are prepared using the following ingredients:

|  | A | B | C |
|---|---|---|---|
| Flour | 135.5 g | 135.5 g | 135.5 g |
| Salt | 2.5 g | 2.5 g | 2.5 g |
| Water | 36 g | 28 g | 36 g |
| Lard | 64 g | 64 g | 80 g |

Lard is cut into the flour in a 1½ minute stage. Lard is extremely soft at room temperature and cuts, smears and penetrates into the flour during this stage.

Dough A is soft and moldable, easy to roll, greasy and difficult to pick up once rolled out. It flutes easily and produces a nice crust. Shrinkage of the shell occurs (~⅛ inch) and the sides sink slightly on baking. The texture of the crust is tender, soft with small flakes and fragile. The bottom crust of the filled pie softened and maintained some structural integrity.

Dough B is similar to dough A except that the sides do not sink. The texture of the crust is soft, tender with small flakes and more fragile than dough A. The crust falls apart if not carefully handled.

Dough C is paste-like and difficult to roll out. When a crust is molded into the pie tin, the sides fall down and the bottom bubbles up. The texture of the crust is tender and soft with small flakes like doughs A and B, but has a much oilier mouthfeel.

The preparation of crusts with lard is repeated except that the ingredients are refrigerated overnight at 40+° F., and the shorter and longer shortening cutting times set out in Examples 4 and 5 above are employed. A shorter cutting time produces a longer flake crust; a longer cutting time produces a smaller flake or semi-flaky/short-flake type of crust. The crust textures produced are tender, soft, flaky and more fracturable than the crusts prepared with all-purpose shortening control of Example 4 above. The crusts have a distinctly beefy flavor. Lard crusts filled with cherry pie filling softened and become soggy. Unlike the all-purpose long-flake crust, lard long-flake crust bottoms maintain some flakiness.

EXAMPLE 7

In this Example, more crusts and pies like those described in Example 5 (using the fat of Example 1) are prepared, except that the water and fat levels are varied.

The following sample doughs are prepared:

|  | D | E | F | G | H |
|---|---|---|---|---|---|
| Flour | 135.5 g | 135.5 g | 135.5 g | 135.5 g | 135.5 g |
| Salt | 2.5 g | 2.5 g | 2.5 g | 2.5 g | 2.5 g |
| Water | 40 g | 36 g | 28 g | 36 g | 36 g |
| Fat | 64 g | 64 g | 64 g | 70.4 g | 80 g |

A short (1½ minute) stage of cutting the fat into the flour is employed. The fat is moderately soft at ambient temperature and cuts into the flour well, forming discrete particulates of fat dispersed in the flour. It does not smear or penetrate the flour like the all-purpose shortening control of Example 4 or the lard control of Example 6.

Samples D and E are similar, being moderately soft, easy to roll out, greasy to the touch, moldable and easy to flute. The doughs are not as soft as the lard doughs, so they are easier to move when rolled out. Like the lard doughs, care must be used to prevent tearing of the dough. Both doughs exhibit some shrinkage similar to the lard controls (~⅛ inch). The texture of the crusts are tender with long-flakes and harder than the lard crusts. The bottom crust of sample D filled pie softened, yet was very strong and demonstrated good structural integrity.

Sample F dough is firmer and requires more force to form a ball and roll out. Flour is needed to roll out. This dough is short and tore extensively when handling. The baked crust has less puff and square flat fluted edges. The texture of the crust is softer and the flakes not as long as samples D and E.

The sample G dough and pie crust is similar to samples D and E. The crust has a slightly more oily mouthfeel.

The sample H dough is much softer and easier to roll out than samples D, E, F, or G. The fat penetrated the flour when it is first cut in. It is greasy, moldable, difficult to move once rolled out, easy to flute. It is more similar to the sample A and B lard doughs of Example 6. On baking, the sides fell down and the bottom bubbled up. The texture of the crust is softer with small flakes and more tender than samples D, E, F, or G, resembling sample A lard dough but having an oilier mouthfeel.

EXAMPLE 8

This example illustrates the preparation of pie shells of this invention using the fats prepared in Example 2 above (both the steam deodorized and the distilled fraction in a ratio of 75 to 25).

A pie shell dough is prepared by cutting 48 g steam deodorized Example 2 fat and 16 g distilled Example 2 fat into 135.5 g flour and 2.5 g salt and then adding 40.5 g water. A control pie shell dough is prepared by cutting 64 g Hyco TM all-purpose vegetable shortening into the same amount of flour and salt and then adding 35 g water. The doughs are rolled out in the conventional manner. The control dough is tackier, wetter to the touch, less firm and easier to roll out than the Example 2 fat dough.

Single-crust pie pastries are baked at 425° F. for 17 minutes (2 minutes less for the control). The single-crust shells are filled with cherry pie filling. Double-crust pies are filled with cherry pie filling and then baked at 425° F. for about 45 minutes.

Two days after filling, both test and control single-crust pie shells exhibit softening from the filling. The edges are not as soft as an Example 4 control pie, which exhibits more shell softening from the filling. Unlike the Hyco TM control, which has edges that are soft and tender and flaky with small flakes, the edges of the shell made with Example 2 fats are less soft, and more flaky with long flakes. The bottom crust of the pie made using the test fat is soft with more integrity, yet flaky, different from the very soft, mushy and no longer flaky bottom layer on the Hyco TM control.

EXAMPLE 9

In this example, a pie crust is prepared using the triglyceride mixture of Example 3 as the fat component.

The fat mixture at room temperature (63.5 g @ ~72° F.) is cut into 135.5 g flour and 2.5 g salt in the first stage with some difficulty. The fat forms small nonuniform chunks and did not smear or penetrate the flour like the all-purpose shortening of Example 4. After this stage, much additional water than the Example 4 control is needed to form a cohesive ball (70 g). The dough is very elastic and extremely difficult to roll out.

Distinct particulates of fat are visible in the unbaked shell. On baking, the fat in the shell melted, leaving holes or pockets in the crust, and the crust shrinks. The texture is hard and tough. A Compu-Trac TM measurement (@ 150° C.) shows 2.56% moisture (day 1).

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

I claim:

1. In a pie shell having a fat component, an improvement wherein at least 25% of the fat component is replaced with triglycerides both bearing long, saturated residues derived from $C_{16}$ to $C_{22}$ fatty acids, and short acid residues derived from the group consisting of acetic acid, propionic acid, butyric acid, and mixtures of these in amounts sufficient to increase the cohesiveness and integrity of the shell when filled with a moist filling such that pie pieces made with the shells can be lifted without breaking apart.

2. An improvement according to claim 1 wherein the long acids are derived from hydrogenated oils having at least about 75% stearic acid residues, and the short acids are derived from butyric acid.

3. An improvement according to claim 1 wherein the long acids are derived from hydrogenated oils having at least about 75% stearic acid residues, and the short acids are derived from a mixture of acetic acid and propionic acid.

4. An improvement according to claim 1 wherein the long acids are derived from hydrogenated oils having at least about 75% stearic acid residues, and the short acids are derived from a mixture of acetic acid and propionic acid, and butyric acid.

5. An improvement according to claim 1 wherein the triglycerides replace the entire fat component of the pie shell.

6. An improvement according to claim 1 wherein the long acids are derived from hydrogenated oils having at least about 75% stearic acid residues, and the short acids are derived from a mixture of acetic and butyric acid.

7. An improvement according to claim 1 wherein the pie shells exhibit long-flake flakiness.

8. An improvement according to claim 1 wherein the long, saturated residues are derived from oils selected from the group consisting of cottonseed, canola, and soybean oil.

9. A method for improving the structural integrity of a filled pie which has a shell containing a fat component comprising replacing at least 25% of the fat component with triglycerides bearing tooth long, saturated fatty acid residues derived from $C_{16}$ to $C_{22}$ fatty acids, and short acid residues derived from the group consisting of acetic acid, propionic acid, butyric acid, and mixtures of these.

10. A method according to claim 9 wherein the long residues are predominantly stearic acid residues and the short acids are butyric acid residues.

11. A method according to claim 9 wherein the long residues are predominantly stearic acid residues and the short acids comprise a mixture of acetic and propionic acid residues.

12. A method according to claim 9 wherein the long residues are predominantly stearic acid residues and the short acid residues comprise a mixture of acetic and butyric acid residues.

13. A method according to claim 9 wherein the long, saturated fatty acid residues are derived from oils selected from the group consisting of cottonseed, canola, and soybean oil.

14. A method according to claim 9 wherein the pie shells exhibit long-flake flakiness.

15. A pie shell composition comprising a starch component, an aqueous component, and a fat component, wherein at least 25% of the fat component comprises low-calorie triglycerides bearing both $C_2$ to $C_4$ short acid residues and long $C_{16}$ to $C_{22}$ saturated fatty acid residues, wherein the short acid residues are derived from acids selected from the group consisting of a mixture of acetic and propionic acid and a mixture of acetic acid, propionic acid, and butyric acid.

* * * * *